(12) United States Patent
Sekino et al.

(10) Patent No.: US 9,236,753 B2
(45) Date of Patent: Jan. 12, 2016

(54) POWER SOURCE DEVICE AND METHOD OF CONTROLLING ASSEMBLED BATTERY

(71) Applicant: Kabushiki Kaisha Toshiba, Tokyo (JP)

(72) Inventors: Masahiro Sekino, Tokyo (JP); Takashi Sudo, Nagano (JP); Shinichiro Kosugi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 182 days.

(21) Appl. No.: 14/018,042

(22) Filed: Sep. 4, 2013

(65) Prior Publication Data

US 2014/0062408 A1    Mar. 6, 2014

(30) Foreign Application Priority Data

Sep. 5, 2012    (JP) ................. 2012-195239

(51) Int. Cl.
| | |
|---|---|
| *H02J 7/00* | (2006.01) |
| *B60L 11/18* | (2006.01) |
| *B60L 3/00* | (2006.01) |
| *B60L 3/12* | (2006.01) |

(52) U.S. Cl.
CPC ............ *H02J 7/0068* (2013.01); *B60L 3/0046* (2013.01); *B60L 3/12* (2013.01); *B60L 11/1803* (2013.01); *B60L 11/1816* (2013.01); *B60L 11/1824* (2013.01); *B60L 11/1862* (2013.01); *B60L 11/1866* (2013.01); *B60L 11/1872* (2013.01); *B60L 11/1877* (2013.01); *B60L 2210/40* (2013.01); *B60L 2230/16* (2013.01); *B60L 2240/545* (2013.01); *B60L 2240/547* (2013.01); *B60L 2240/549* (2013.01); *B60L 2240/80* (2013.01); *B60L 2250/10* (2013.01); *B60L 2270/20* (2013.01); *Y02T 10/7005* (2013.01)

(58) Field of Classification Search
CPC . H01M 10/482; H01M 10/44; H01M 10/441; H02J 7/0014
USPC .......................................... 320/116, 118–120
See application file for complete search history.

(56) References Cited

U.S. PATENT DOCUMENTS

| | | | | |
|---|---|---|---|---|
| 5,825,155 A | * | 10/1998 | Ito ..................... | G01R 19/16542 320/118 |
| 5,998,967 A | * | 12/1999 | Umeki et al. ................. | 320/122 |
| 2011/0011653 A1 | * | 1/2011 | Mizutani et al. ............. | 180/65.1 |

FOREIGN PATENT DOCUMENTS

| | | |
|---|---|---|
| JP | 2007-311107 | 11/2007 |
| JP | 2011-078249 | 4/2011 |

* cited by examiner

*Primary Examiner* — Nghia Doan
(74) *Attorney, Agent, or Firm* — Baker Botts L.L.P.

(57) ABSTRACT

A power source device includes an assembled battery having a plurality of secondary battery cells connected in series, and a plurality of discharge circuits connected in parallel with the secondary battery cells, respectively. A charge control circuit performs constant current charging to the assembled battery, and when voltages of one or a plurality of the secondary battery cells out of the plurality of secondary battery cells have reached a prescribed first voltage, drives the discharge circuits connected to the secondary battery cells whose voltage have reached the first voltage to discharge, and performs constant voltage charging to the relevant assemble battery.

3 Claims, 7 Drawing Sheets

POWER SOURCE DEVICE AND METHOD OF CONTROLLING ASSEMBLED BATTERY

CROSS-REFERENCE TO RELATED APPLICATION

This application is based upon and claims the benefit of priority from Japanese Patent Application No. 2012-195239, filed on Sep. 5, 2012, the entire contents of which are incorporated herein by reference.

FIELD

An embodiment of the present invention relate to a power source device, and a method of controlling an assembled battery.

BACKGROUND

Conventionally, electric vehicles mounted with an assembled battery device as a driving power source are known. One example of an assembled battery device has a plurality of assembled battery modules which are connected in series, and a battery management unit (BMU) to control the respective assembled battery modules. Each of the assembled battery modules is provided with an assembled battery having a plurality of secondary battery cells which are connected in series, and a voltage temperature monitoring circuit (VTM) to monitor the assembled battery. The battery management unit monitors a pack voltage and a pack current of a battery pack composed of a plurality of assembled battery modules, and cell voltages that are voltages of the respective secondary battery cells which the assembled battery module has, and so on.

When an assembled battery device is stored for a long time, the voltage balance between secondary battery cells may remarkably deviate by the difference of self-discharge amount between the secondary battery cells. A secondary battery cell with a large self-discharge amount has a small remaining capacity, and a secondary battery cell with a small self-discharge amount has a large remaining capacity. If an assembled battery device is discharged in the state in which the voltage balances between the respective secondary battery cells remarkably deviate, a secondary battery cell having the smallest remaining capacity, out of a plurality of the secondary battery cells, firstly reaches a working lower limit voltage. Similarly, if the assembled battery device is charged in the state in which the voltage balances between the respective secondary battery cells remarkably deviate, a secondary battery cell having the largest remaining capacity, out of the plurality of secondary battery cells, firstly reaches a working upper limit voltage. Accordingly, the effective capacity of the assembled battery device becomes smaller compared with the capacity (or, a rated capacity) before stored.

DETAILED DESCRIPTION

A power source device of an embodiment includes an assembled battery which has a plurality of secondary battery cells connected in series, a plurality of discharge circuits which is connected in parallel with the plurality of the secondary battery cells, respectively, to discharge the secondary battery cell to which each of the discharge circuit is connected, and a charge control circuit which repeats a charging processing. The charging processing perform constant current charging to the assembled battery; when voltages of one or a plurality of the secondary battery cells out of the plurality of secondary battery cells have reached a prescribed first voltage during performing the constant current charging, drive the discharge circuit corresponding to the secondary battery cell which has reached the prescribed first voltage to perform discharging, and perform constant voltage charging to the assembled battery; and when voltage of the secondary battery cell during being discharged has reached a prescribed second voltage lower than the first voltage, stop discharging and performing the constant voltage charging.

Hereinafter, a power source device and a method of controlling an assembled battery according to the present embodiment will be described with reference to the drawings.

Figure 1:
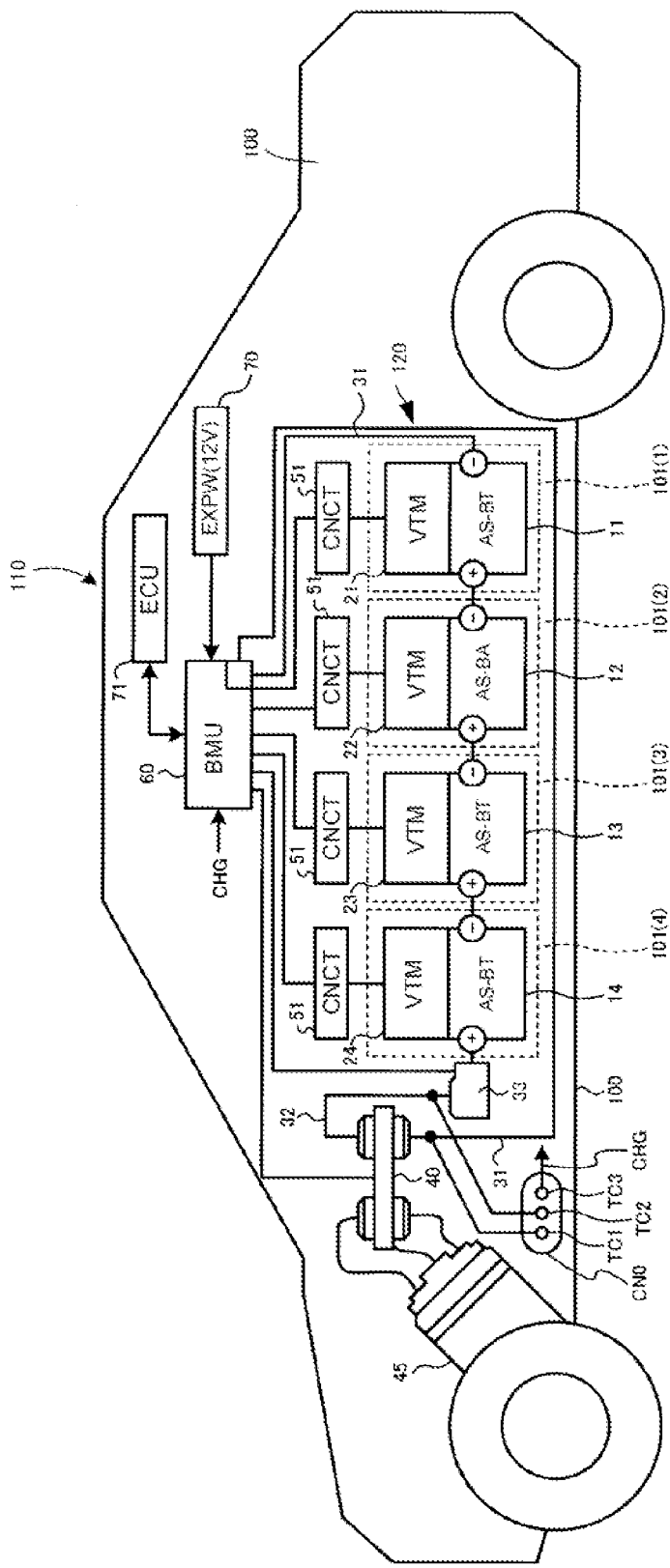
FIG. 1 is a schematic diagram of a vehicle provided with a power source device according to the present embodiment.

FIG. 1 is a schematic diagram of a vehicle provided with a power source device according to the present embodiment. In FIG. 1, a vehicle 100, a position of the vehicle 100 on which a power source device 110 is mounted and a driving motor for the vehicle 100 and so on are shown schematically. The power source device 110 includes a secondary battery device 120, a switch device 33, a battery management unit 60, a connector CN0, and connectors 51.

The secondary battery device 120 has a plurality of assembled battery modules 101(1)-101(4) which are connected in series. Each of the assembled battery modules 101(1)-101(4) can independently be detached, and can be replaced with another assembled battery module at the time of maintenance, and so on. The assembled battery module 101(1) has an assembled battery (AS-BT) 11. The assembled battery module 101(2) has an assembled battery 12. The assembled battery module 101(3) has an assembled battery 13. In addition, the assembled battery module 101(4) has an assembled battery 14.

Figure 2A:
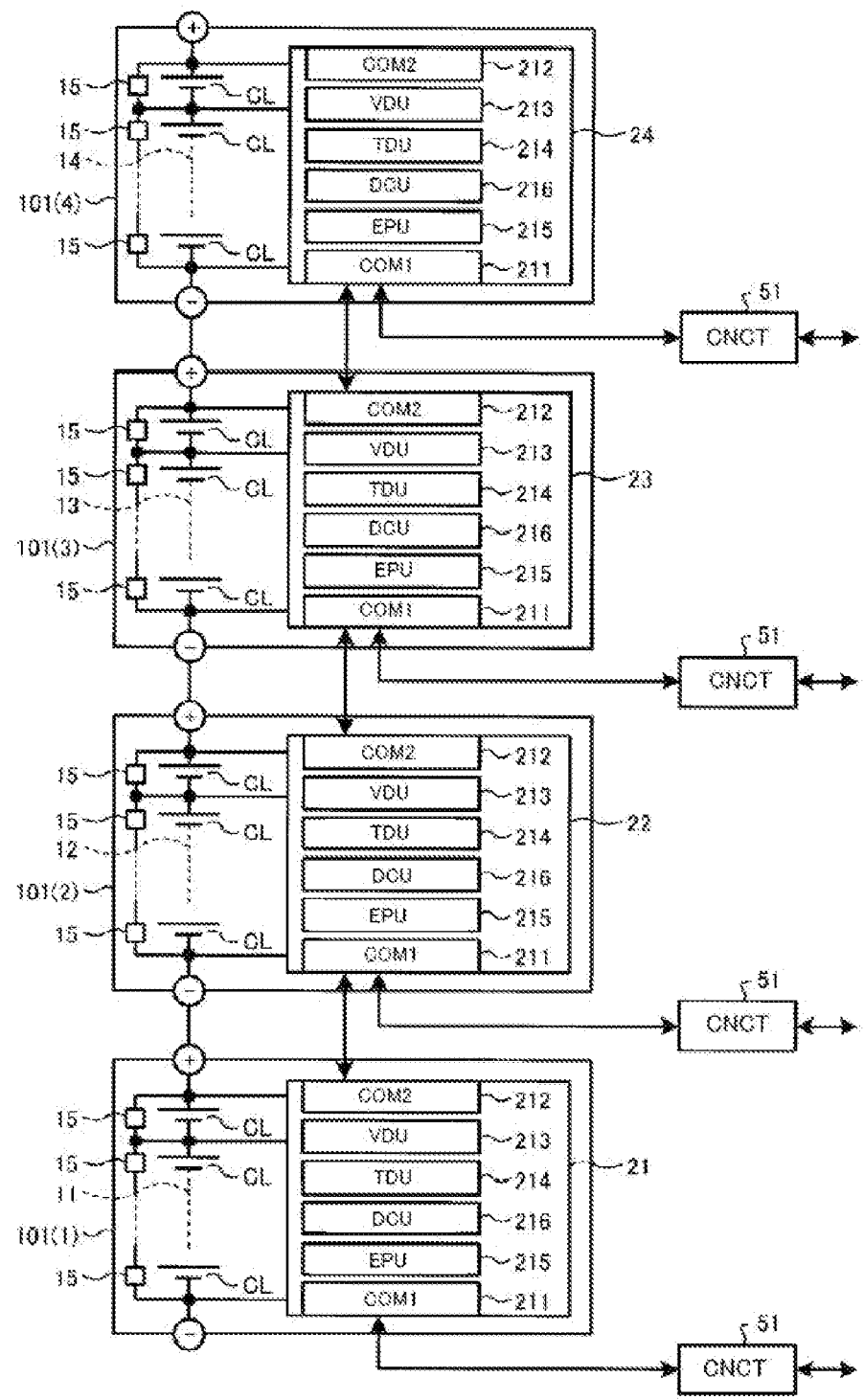
FIG. 2A is a functional diagram of a voltage temperature monitoring circuits according to the present embodiment.

FIG. 2A shows a functional block of voltage temperature monitoring circuits (VTM) to monitor the respective assembled batteries according to the present embodiment. The assembled batteries 11-14 have the same configuration, and each of the assembled batteries 11-14 has a plurality of secondary battery cells CL which are connected in series. A discharge circuit 15 is connected in parallel with each of the secondary battery cells CL. The discharge circuit 15 performs equalization processing (cell balance processing) to suppress the voltage variation among a plurality of the secondary battery cells CL.

Figure 2B:
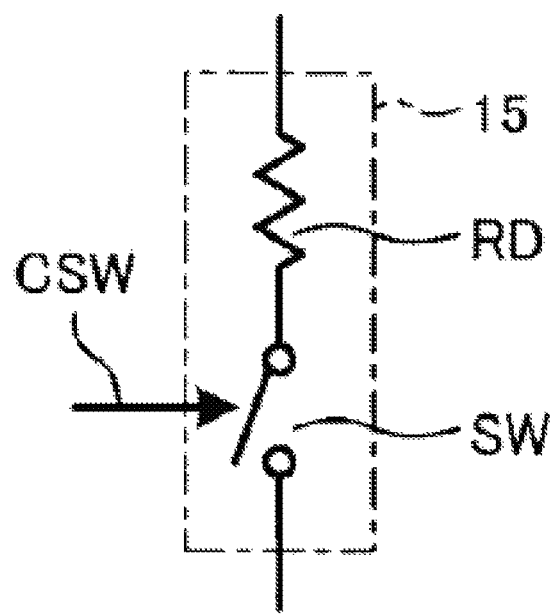
FIG. 2B is a circuit diagram of a discharge circuit.

FIG. 2B shows the discharge circuit 15. The discharge circuit 15 is provided with a discharge resistor RD, and a discharge switch SW connected in series with the discharge resistor RD. The discharge resistor RD consumes a discharge current (discharge power) to make the voltage of the secondary battery cell CL decrease. The discharge switch SW is controlled so as to be turned ON or OFF based on a switch control signal CSW, to thereby perform discharging the secondary battery cell CL to which the discharge circuit 15 including the discharge switch SW is connected.

In the present embodiment, the secondary battery device 120 has the four assembled battery modules 101(1)-101(4) which are connected in series. But, it is only necessary for the secondary battery device 120 to have at least one assembled battery module.

One terminal of a connection line 31 is connected to a negative electrode terminal of the assembled battery module 101(1) located at the negative electrode side of the secondary battery device 120. The other terminal of the connection line 31 is connected to a negative input terminal of an inverter 40.

In addition, one terminal of a connection line 32 is connected to a positive electrode terminal of the assembled battery module 101(4) located at the positive electrode side of the secondary battery device 12 through the switch device 33. The other terminal of the connection line 32 is connected to a positive input terminal of an inverter 40.

Figure 3A:
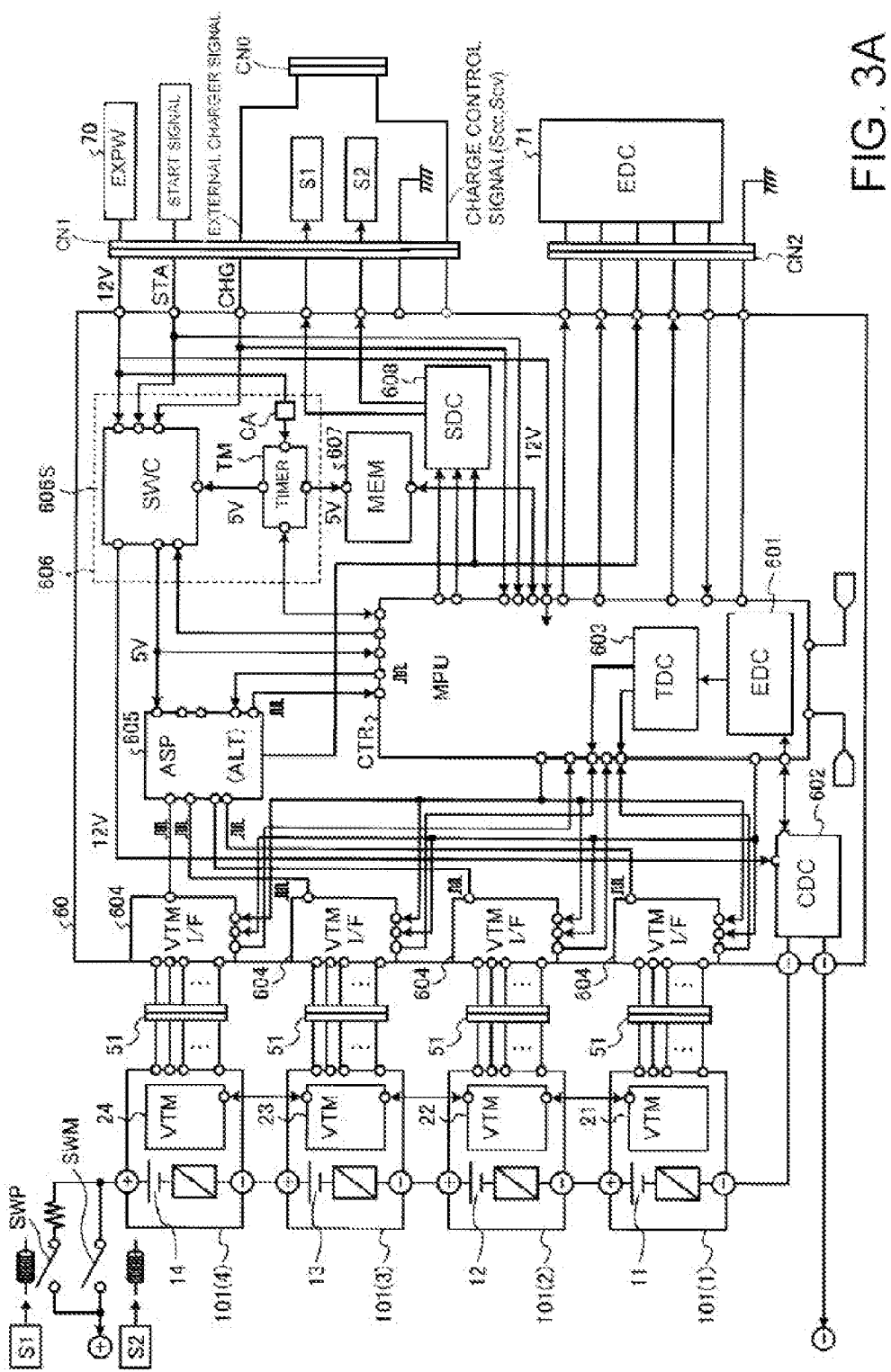
FIG. 3A is a diagram showing a whole block of a battery management unit according to the present embodiment.
Figure 3B:
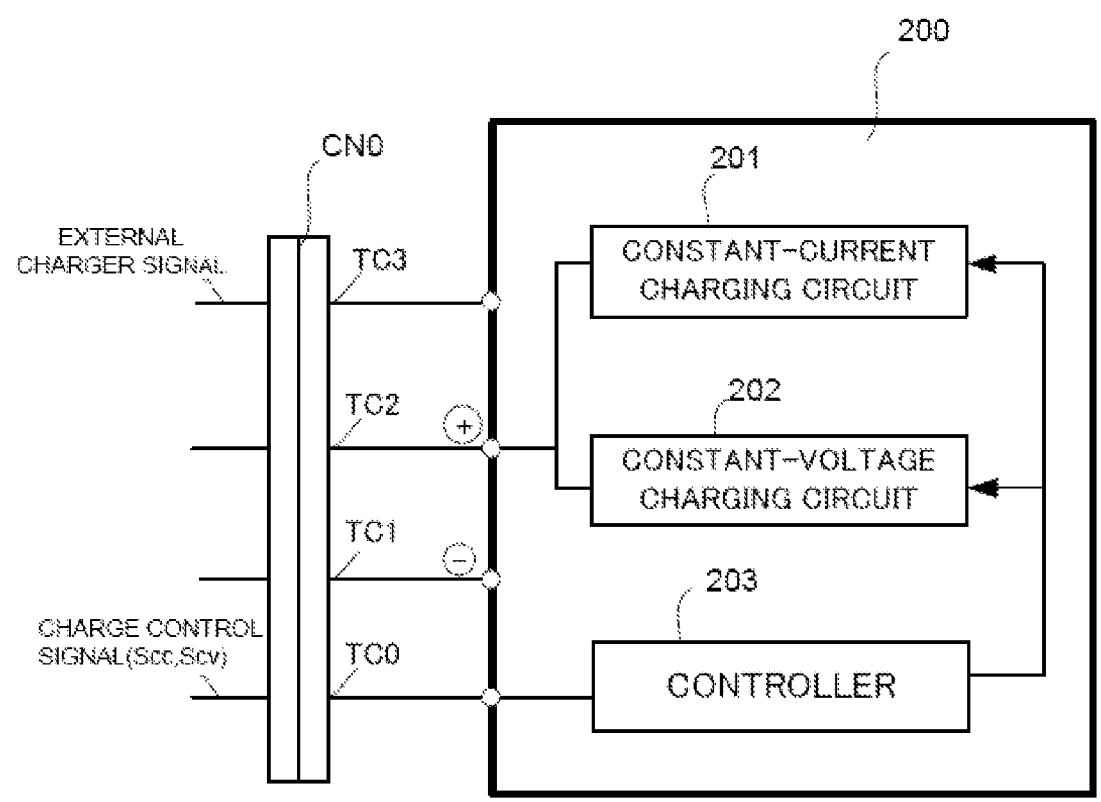
FIG. 3B is a diagram showing a external charger.

The switch device 33 is connected in series with the plurality of assembled battery modules 101(1)-101(4), and makes the electrical connection of the plurality of assembled battery modules 101(1)-101(4) and the inverter 40 ON or OFF. That is, when the switch device 33 is turned ON, current flows in the assembled batteries 11-14. In the present embodiment, the switch device 33 includes a main switch SWM and a pre-charge switch SWP, as shown in FIG. 3. The main switch SWM is turned ON, at the time of supplying the power of the secondary battery cells CL which the assembled batteries 11-14 of the assembled battery modules 101(1)-101(4) have, to a load. The pre-charge switch SWP is used to prevent rush current flowing into the load.

More specifically, at the time of electrically connecting a load (a motor 45, for example) at the vehicle 100 side and the assembled battery modules 101(1)-101(4) by the switch device 33, the pre-charge switch SWP is turned ON, and after the potential difference between the assembled battery modules 101(1)-101(4) and the load has become small, the main switch is turned ON. By this means, the adhesion of the main switch SWM caused by the rush current is prevented. Each of the pre-charge switch SWP and the main switch SWM is constituted as a relay circuit.

The inverter 40 converts an applied DC voltage into a three-phase alternating current (AC) voltage for motor driving. In the inverter 40, the conversion from the DC voltage to the AC voltage is controlled based on a control signal from the battery management unit (BMU) 60 or an electronic control unit (ECU) 71 which controls the whole operation of the vehicle 100, which will be described later. Three-phase output terminals of the inverter 40 are connected to three-phase input terminals of the motor 45, respectively. The drive power (turning force) of the motor 45 is transmitted to drive wheels through a differential gear unit, for example.

An independent external power source (EXPW) 70 is connected to the battery management unit 60. The external power source 70 is a lead storage battery of rated voltage of 12 V to supply power to an in-vehicle accessory, for example. In addition, the electronic control unit 71 to perform the management of the whole vehicle in response to an operation input by a driver or the like is also connected to the battery management unit 60.

As shown in FIG. 1 and FIG. 2A, the assembled battery module 101(1) has the assembled battery 11 and a voltage temperature monitoring circuit (VTM) 21. The assembled battery module 101(2) has the assembled battery 12 and a voltage temperature monitoring circuit 22. The assembled battery module 101(3) has the assembled battery 13 and a voltage temperature monitoring circuit 23. The assembled battery module 101(4) has the assembled battery 14 and a voltage temperature monitoring circuit 24. Here, the assembled battery modules 101(1)-101(4) have the similar configuration. Accordingly, in the following description, the assembled battery module 101(1) will be mainly described.

The voltage temperature monitoring circuit 21 has a first communication unit (COM1) 211 connected to the battery management unit 60 through a connector (CNCT) 51, and a second communication unit (COM2) 212 connected to a first communication unit 211 of the voltage temperature monitoring circuit 22. In addition, the voltage temperature monitoring circuit 22 has a first communication unit 211 connected to the battery management unit 60 through a connector 51 and also connected to the second communication unit 212 of the voltage temperature monitoring circuit 21, and a second communication unit 212 connected to a first communication unit 211 of the voltage temperature monitoring circuit 23. In addition, the voltage temperature monitoring circuit 23 has the first communication unit 211 connected to the battery management unit 60 through a connector 51 and also connected to the second communication unit 212 of the voltage temperature monitoring circuit 22, and a second communication unit 212 connected to a first communication unit 211 of the voltage temperature monitoring circuit 24. In addition, the voltage temperature monitoring circuit 24 has the first communication unit 211 connected to the battery management unit 60 through a connector 51 and also connected to a second communication unit 212 of the voltage temperature monitoring circuit 23, and the second communication unit 212. When a voltage temperature monitoring circuit exists at a more positive electrode side than the voltage temperature monitoring circuit 24, the second communication unit 212 of the voltage temperature monitoring circuit 24 is connected to a first communication unit 211 of the voltage temperature monitoring circuit at the higher voltage side.

In addition, the second communication unit 212 of the voltage temperature monitoring circuit 21 and the first communication unit 211 of the voltage temperature monitoring circuit 22 may be connected, and the second communication unit 212 of the voltage temperature monitoring circuit 23 and the first communication unit 211 of the voltage temperature monitoring circuit 24 may be connected, and the first communication unit 211 of the voltage temperature monitoring circuit 21 and the first communication unit 211 of the voltage temperature monitoring circuit 23 may be connected to the battery management unit 60 through the connectors 51, respectively. In this case, the voltage temperature monitoring circuit 21 and the voltage temperature monitoring circuit 22 are connected to each other through the second communication unit 212 of the voltage temperature monitoring circuit 21 and the first communication unit 211 of the voltage temperature monitoring circuit 22, and can communicate with each other. Similarly, the voltage temperature monitoring circuit 23 and the voltage temperature monitoring circuit 24 can communicate with each other.

More specifically, when the voltage temperature monitoring circuit 21 and the voltage temperature monitoring circuit 22 are connected, an information input and output terminal of the first communication unit 211 of the voltage temperature monitoring circuit 21 is connected to the battery management unit 60 through the connector 51. An information input and output terminal of the second communication unit 212 of the voltage temperature monitoring circuit 21 is connected to an information input and output terminal of the first communication unit 211 of the voltage temperature monitoring circuit 22.

In addition, when the voltage temperature monitoring circuit 23 and the voltage temperature monitoring circuit 24 are connected, an information input and output terminal of the first communication unit 211 of the voltage temperature monitoring circuit 23 is connected to the battery management unit 60 through the connector 51. An information input and output terminal of the second communication unit 212 of the voltage temperature monitoring circuit 23 is connected to an information input and output terminal of the first communication unit 211 of the voltage temperature monitoring circuit 24.

In addition, the voltage temperature monitoring circuit 21 is further provided with a voltage detecting unit (VDU) 213, a temperature detecting unit (TDU) 214, an equalization processing unit (EPU) 215 and a diagnosis circuit (D CU) 216.

The voltage detecting unit 213 detects a voltage (hereinafter, called a cell voltage) of each of the plurality of secondary battery cells CL composing the assembled battery 11. In other words, the voltage detecting unit 213 detects a voltage between terminals of each of the plurality of secondary battery cells CL composing the assembled battery 11 as the cell voltage. And, the voltage detecting unit 213 inputs a voltage signal indicating the whole detected cell voltages to the battery management unit 60 through the first communication unit 211 and an interface circuit (VTM I/F) 604 (refer to FIG. 3).

The temperature detecting unit 214 detects a temperature of each of the plurality of the secondary battery cells CL composing the assembled battery 11 or a temperature in the vicinity of the plurality of the secondary battery cells CL. The temperature detecting unit 214 inputs a temperature signal indicating the detected temperatures to the battery management unit 60 through the first communication unit 211 and the interface circuit 604.

The equalization processing unit 215 performs an equalizing processing to equalize the voltages (storage capacities) of the plurality of the secondary battery cells CL composing the assembled battery 11.

The equalization processing will be described in detail later.

The diagnosis circuit 216 diagnoses the assembled battery module 101(1), and outputs an abnormality notification signal to notify an abnormality of the assembled battery module 101(1). For example, the abnormality notification signal is a pulsation signal (pulse signal; rectangular signal) which switches to an "H" level or an "L" level with a previously set fundamental frequency, when there is an abnormality in the assembled battery module 101(1), and is a signal of the "H" level or the "L" level which does not pulsate at the normal time.

FIG. 3 is a diagram showing a whole block of the battery management unit according to the present embodiment. The battery management unit 60 is provided with a current detecting circuit (CDC) 602, the interface circuits 604, an alert signal processor (ASP) 605, a power source supplying management unit 606, a switch driving circuit (SD C) 608, a memory (MEM) 607, and a control circuit (MPU: Micro Processing Unit) CTR.

The current detecting circuit 602 detects a current flowing through the series-connected assembled batteries 11-14, and outputs a current signal to the control circuit CTR. The memory 607 is an EEPROM (Electronically Erasable and Programmable Read Only Memory), for example. The memory 607 records a program to define the operation of the control circuit CTR.

The interface circuits 604 are connected to the first communication units 211 of the voltage temperature monitoring circuits 21-24 through the connectors 51, respectively. The voltage signal outputted from the voltage detecting unit 213, the temperature signal outputted from the temperature detecting unit 214, and the abnormality notification signal outputted from the diagnosis circuit 216 are supplied from each of the voltage temperature monitoring circuits 21-24 to the interface circuit 604 through the connector 51. Various signals (a logic signal, for example) transmitted from the control circuit CTR are inputted from the interface circuits 604 to each of the voltage temperature monitoring circuits 21-24.

The interface circuit 604 supplies the voltage signal outputted from the voltage detecting unit 213, the temperature signal outputted from the temperature detecting circuit 214, and so on, to the control circuit CTR through bidirectional serial communication, and supplies the abnormality notification signal outputted from the diagnosis circuit 216 to the alert signal processor 605.

The alert signal processor 605 receives the abnormality notification signal from the interface circuit 604 and an alert signal from the control circuit CTR. The alert signal processor 605 judges whether or not the abnormality notification signal indicates normality, and judges whether or not the alert signal indicates normality. When the abnormality notification signal or the alert signal indicates normality, the alert signal processor 605 outputs a second alert signal which switches to the "H" level or the "L" level with a previously set frequency. When the abnormality notification signal or the alert signal is kept in the state switched to the "H" level, the alert signal processor 605 outputs the second alert signal of the "H" level at the normal time as the second alert signal of the "L" level at the normal time, for example.

The second alert signal outputted from the alert signal processor 605 is supplied to the control circuit CTR, the switch driving circuit 608 and the electronic control unit 71 connected through a connector CN2.

The switch driving circuit 608 outputs a signal S1 to control the operation of the pre-charge switch SWP, and a signal S2 to control the operation of the main switch SWM, by the control of the control circuit CTR.

The signals S1, S2 are supplied to the switch device 33 (refer to FIG. 1) through a connector CN1. The pre-charge switch SWP and the main switch SWM are relay circuits which are turned ON or OFF by the signals S1, S2, respectively.

The control circuit CTR controls the operation of the secondary battery device 120. When the abnormality notification signal indicates an abnormality, for example, the control circuit CTR judges that there is an abnormality in the corresponding assembled battery modules 101(1)-101(4) by the second alert signal supplied from the alert signal processor 605. And the control circuit CTR controls the switch driving circuit 608 to make the pre-charge switch SWP and the main switch SWM to be turned OFF.

Power of the power source voltage is supplied from the external power source (EXPW) 70 to the power source supplying management unit 606. The power source supplying management unit 606 supplies the power to the current detecting circuit 602, the alert signal processor 605, the memory 607 and the control circuit CTR. The power source supplying management unit 606 is provided with a switching circuit 606S to make supplying of the power to the control circuit CTR ON or OFF, and a timer TM to output a wakeup signal to instruct start-up of the switching circuit 606S to the switching circuit 606S.

The power source voltage of 12 V from the external power source 70 is converted into a DC voltage of 5 V by a DC/DC conversion circuit CA, and the DC voltage of 5V is applied to the timer TM. The timer TM operates with the DC voltage of 5 V, and outputs the wakeup signal to the switching circuit 606S. A start signal STA, an external charger signal CHG, a switching control signal from the control circuit CTR, the wakeup signal from the timer TM, and the power from the external power source 70 are supplied to the switching circuit (SWC) 606S.

In addition, the wakeup signal becomes the "H" level for each set time. The timing when the wakeup signal becomes the "H" level is set by the control circuit CTR.

The power source voltage, the start signal STA and the external charger signal CHG are supplied to the battery management unit 60 through the connector CN1. The power source voltage is supplied from the external power source 70, the start signal STA is supplied from a start detecting unit (not shown), and the external charger signal CHG is supplied from an external charger 200. In addition, the battery management unit 60 transmits and receives signals to and from the electronic control unit 71 through the connector CN2.

When a start detecting unit (not shown) detects that a start button (not shown) has been pushed down, the start signal STA becomes the "H" level, and when the start detecting unit detects that the start button (not shown) has been pushed down again, the start signal STA becomes the "L" level. When the external charger is connected to the secondary battery device 120, the external charger signal CHG becomes the "H" level, and when the connection is released, the external charger signal CHG becomes the "L" level. The wakeup signal, the start signal STA and the external charger signal CHG are also supplied to the control circuit CTR.

In addition, in the case in which the secondary battery device 120 is mounted on an apparatus other than the vehicle 100, when a power source ON operation is performed to the apparatus on which the secondary battery device 120 is mounted, the start signal STA becomes the "H" level, and when a power source OFF operation is performed, the start signal STA becomes the "L" level.

When at least one of the start signal STA, the external charger signal CHG and the wakeup signal becomes the "H" level, the switching circuit 606S converts the DC voltage of 12 V applied from the external power source 70 into the DC voltage of 5V by the inner DC/DC conversion circuit CA, and applies the DC voltage of 5V to the alert signal processor 605 and the control circuit CTR.

In addition, when at least one of the start signal STA, the external charger signal CHG and the wakeup signal becomes the "H" level, the switching circuit 606S converts the power source voltage of 12 V applied from the external power source 70 into a DC voltage of a prescribed magnitude by the inner DC/DC conversion circuit CA, and applies the converted DC voltage to the current detecting circuit 602.

The wakeup signal is supplied to the control circuit CTR from the timer TM, and the start signal STA and the external charger signal CHG are also supplied to the control circuit CTR through the connector CN1. When the DC voltage of 5 V is applied to the control circuit CTR by the switching circuit 606S, the control circuit CTR detects what signal out of the supplied signals has become the "H" level. By this means, the control circuit CTR can confirm what signal has turned ON the switching circuit 606S. After having confirmed by what signal power supplying is performed, the control circuit CTR makes the switching control signal the "H" level to turn ON the switching circuit 606S, and keeps the state in which the power is supplied from the switching circuit 606S.

In addition, the control circuit CTR monitors the wakeup signal, the start signal STA and the external charger signal CHG. When the all signals become the "L" level, the control circuit CTR makes the switching control signal the "L" level to turn OFF the switching circuit 606S. Accordingly, power supplying to the control circuit CTR, the alert signal processor 605 and the current detecting circuit 602 is stopped.

The control circuit CTR is provided with an energy deviation calculating unit (EDC) 601 and a discharge time converting unit (DTC) 603. The energy deviation calculating unit 601 loads the voltage signal outputted from the voltage detecting unit 213 through the first communication unit 211 and the interface circuit 604, and also loads the current signal outputted from the current detecting circuit 602.

The discharge time converting unit 603 calculates a capacity difference between the secondary battery cells from an arrival time until the cell voltage which the voltage signal indicates reaches a predetermined specific voltage and the current value which the current signal indicates. In addition, the discharge time converting unit 603 calculates a discharge time of each of the secondary battery cells CL so as to make the remaining capacities of the secondary battery cells the same, from the calculated capacity difference and the arrival time. That is, the discharge time converting unit 603 calculates a processing time of the equalization processing performed by the equalization processing unit 215.

In addition, the control circuit CTR supplies a signal for controlling the operation of each of the assembled battery modules 101(1)-101(4) to the interface circuits 604. Specifically, when any of the wakeup signal, the start signal STA and the external charger signal CHG is at the "H" level, the control circuit CTR inputs an operation command to make an isolated communication IC (not shown) in the interface circuit 604 in the operating state to the interface circuit 604.

On the other hand, when all signals of the wakeup signal, the start signal STA and the external charger signal CHG have become the "L" level, the control circuit CTR stop inputting the operation command to the interface circuit 604.

In the present embodiment, when any one of the wakeup signal, the start signal STA and the external charger signal CHG is at the "H" level, the control circuit CTR inputs an operation signal which has been switched to the "H" level to the interface circuit 604, to thereby input the operation command to the interface circuit 604.

On the other hand, when all signals of the wakeup signal, the start signal STA and the external charger signal CHG have become the "L" level, the control circuit CTR inputs the operation signal which has been switched to the "L" level to the interface circuit 604, to thereby stop inputting the operation command to the interface circuit 604.

Figure 4:
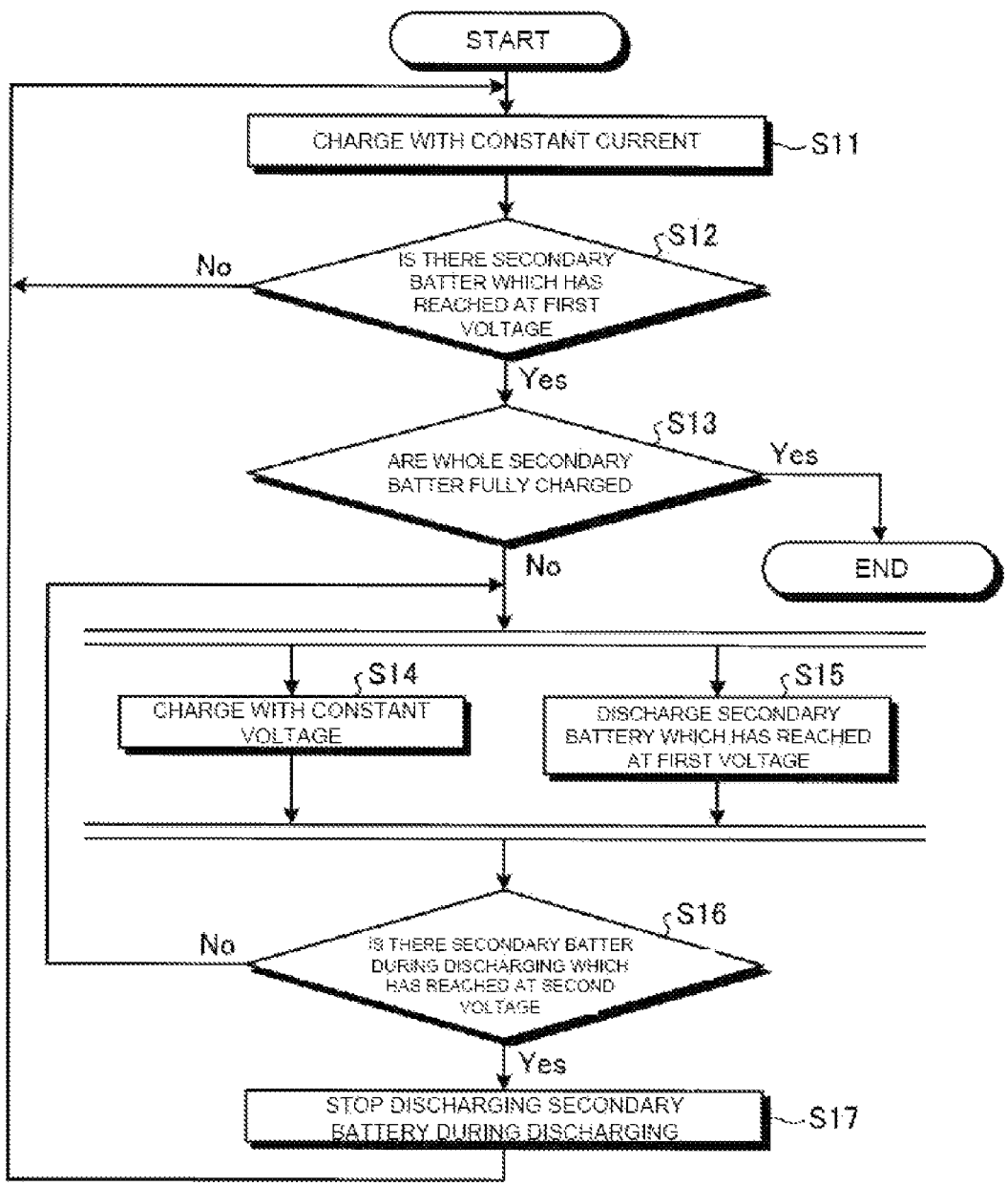
FIG. 4 is a flow chart of a charging processing of the present embodiment.

FIG. 4 is a flow chart of a charging processing of the embodiment. In the following description, in order to simplify the description, an operation to charge the assembled battery 11 composed of three secondary battery cells CL1-CL3 will be described. The cell voltage of each of the secondary battery cells CL1-CL3 when fully charged is 2.8 V, and the voltage of the whole assembled battery 11 when fully charged is 8.4 V. In addition, in the case of charging a plurality of series-connected assembled batteries, the similar charging is performed as the charging described below. In this case, the charging is performed to the plurality of series-connected assembled batteries. In addition, a constant voltage value (CV value) in constant voltage charging (CV charging) is determined based on a sum voltage of the whole assembled batteries based on voltages of the respective assembled batteries at the time point when the constant voltage charging (CV charging) is performed.

Figure 5:
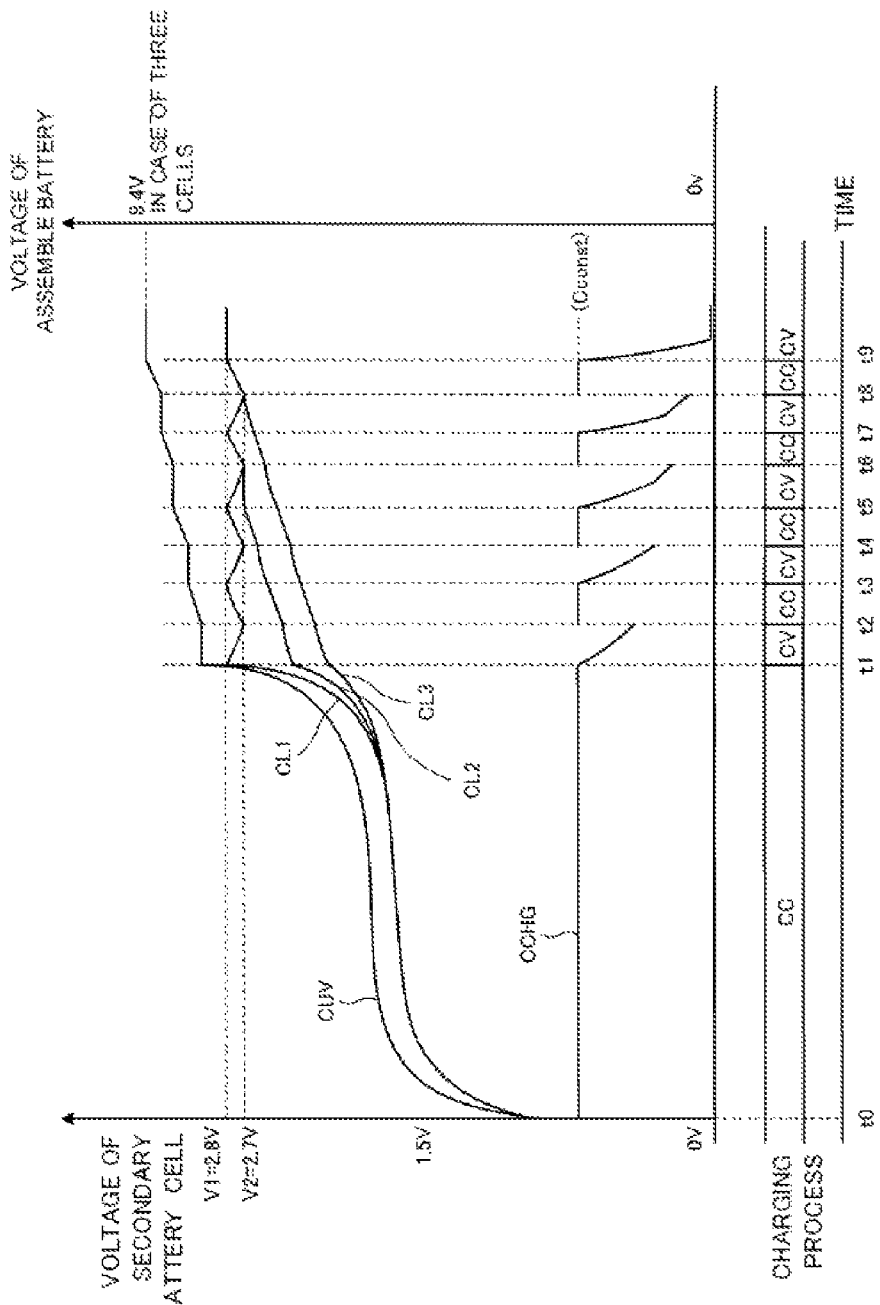
FIG. 5 is a diagram to describe changes in an assembled battery voltage, an assembled battery current and cell voltages of secondary battery cells at the time of charging.

FIG. 5 describes changes in an assembled battery voltage, an assembled battery current and cell voltages of secondary battery cells at the time of charging. To begin with, the battery management unit 60 detects that the external charger signal CHG has become "H" level, to thereby detect that a charging plug of the external charger 200 (refer to FIG. 3) has been fitted in the charging connecter CN0.

Here, a composition of the external charger 200 is explained again with reference to FIG. 3. The external charger 200 is provided with a constant-current charge circuit 201, a constant-voltage charge circuit 202 and a controller 203 which controls the constant-current charge circuit 201 and the constant-voltage charge circuit 202 base on a charge control signal. The external charger 200 is connected to the charging connecter CN0, thereby a positive output terminal of the external charger 200 is connected to a charging terminal TC2 (refer to FIG. 1) and a negative output terminal of the external charger 200 is connected to a charging terminal TC1 (refer to FIG. 1). That is, in FIG. 3, the positive output terminal of the external charger 200 is connected to one terminal of the main switch SWM and one terminal of the pre-charge switch SWP, and the negative output terminal of the external charger 200 is connected to one terminal of the current detecting circuit 602. The external charger 200 is connected to the battery management unit 60 through the connecter CN1 and the charging connecter CN0. The external charger 200 supplies the external charger signal CHG to the battery management unit 60. The battery management unit 60 supplies the charge control signal to the external charger 200. The charge control signal is a signal of constant-current-charge directions Scc or a signal of constant-voltage-charge directions Scv.

When the battery management unit 60 detects that charging plug of the external charger 200 is connected to the charging connector CN0, the battery management unit 60 turns ON the pre-charge switch SWP, to thereby start initial charging of the assembled battery 11 by the power supplied through charging terminals TC1, TC2 of the charging connector CN0. In the initial charging, constant current charging (CC charging) is performed (step S11). In detail, in order to make a charge system into constant current charging (CC charging), the battery management unit 60 sets the charge control signal as the signal of constant-current-charge directions Scc, outputs the signal to the external charger 200 thorough the connector CN1 and the connector CN0, and directs the controller 203 of the external charger 200. As a result, since the external charger 200 changes a charge circuit which performs charge to the constant-current-charge circuit 201, the charging current CCHG supplied to the assembled battery 11 from the external charger 200 becomes a fixed current value (Cconst). As a result of this, the cell voltages of the secondary battery cells CL1-CL3 gradually increase as shown in a term between times t0 and t1. The cell voltages of the secondary battery cells CL1-CL3 indicate storage capacities, respectively.

Next, the battery management unit 60 discriminates whether or not the secondary battery cell whose cell voltage has reached a first voltage V1 exists (step S12), based on the respective cell voltages of the secondary battery cells CL1-CL3 detected by the voltage detecting unit 213 of the voltage temperature monitoring circuit 21. In the present embodiment, the first voltage V1 is 2.8 V that is the voltage when fully charged. In a term between the time t0 and the time t1, since the secondary battery cell whose cell voltage has reached the first voltage V1 does not exist (step S12; No), the battery management unit 60 transfers the processing to the step S11 again and continues the constant current charging (CC charging).

And, when the cell voltage of the secondary battery cell CL1 having the highest cell voltage out of the plurality of secondary battery cells CL1-CL3 reaches the first voltage V1 at the time t1 (step S12; Yes), the battery management unit 60 discriminates whether or not the whole secondary battery cells CL1-CL3 are in the fully charged state (step S13). The fully charged state means that the cell voltage of the secondary battery cell is not less than the voltage when fully charged.

In the discrimination of the step S13, since the secondary battery cells CL2, CL3 are not in the fully charged state yet at the time t1 (step S13; No), the battery management unit 60 performs the constant voltage charging (CV charging) as the charging of the assembled battery 11 (step S14). That is, in order to switch the charging system from the constant current charging (CC charging) to the constant voltage charging (CV charging), the battery management unit 60 changes the charge control signal from the signal of constant-current-charge directions Scc to the signal of constant-voltage-charge directions Scv, and directs the controller 203 of the external charger 200 through the connector CN1 and the connector CN0. As a result, since the external charger 200 changes the charge circuit which performs charge from the constant-current-charge circuit 201 to the constant-potential-charge circuit 202, a voltage of a constant voltage value is applied to the assembled battery 11 from the external charger 200. In this case, the constant voltage value (CV value) is determined based on the cell voltages of the respective secondary battery cells CL or the voltage of the assembled battery 11 at the relevant time point.

In parallel with the constant voltage charging, the battery management unit 60 turns ON the discharge switch SW of the discharge circuit 15 connected to the secondary battery cell CL1 through the equalization processing unit 215 of the voltage temperature monitoring circuit 21. The charging current effectively flowing through the secondary battery cell CL1 is controlled by the discharge circuit 15, to thereby effectively discharge the secondary battery cell CL1 (step S15). That is, the equalization processing is performed to the secondary battery cell CL1.

As a result of these, the secondary battery cell CL1 is effectively discharged during a term between the time t1 and a time t2, and the cell voltage of the secondary battery cell CL1 decreases. But, the other secondary battery cells CL2, CL3 are charged, and the cell voltages of the secondary battery cells CL2, CL3 increase.

Next, the battery management unit 60 discriminates whether or not the cell voltage of the secondary battery cell CL1 has reached a second voltage V2, based on the cell voltage of the secondary battery cells CL1 during discharging which is detected by the voltage detecting unit 213 of the voltage temperature monitoring circuit 21 (step S16). The second voltage V2 is 2.7 V that is lower than the first voltage V1. In the present embodiment, the second voltage V2 is the first voltage V1 (the voltage when fully charged) minus 0.1 V.

In this case, since the cell voltage of the secondary battery cell CL1 does not reach the second voltage V2 until the time t2 (step S16; No), the battery management unit 60 transfers the processing to the step S14 and the step S15 again, and repeats the similar processing.

On the other hand, the cell voltage of the secondary battery cell CL1 reaches the second voltage V2 at the time t2 (step S16; Yes), and the battery management unit 60 turns OFF the discharge switch SW of the discharge circuit 15 connected to the secondary battery cell CL1 during discharging, and stops the discharging (step S17). And, the battery management unit 60 transfers the processing to the step S11, and performs the constant current charging (CC charging) again (step S11). That is, in order to switch the charging system from the constant voltage charging (CV charging) to the constant current charging (CC charging), the battery management unit 60 changes the charge control signal from the signal of constant-voltage-charge directions Svc to the signal of constant-current-charge directions Scc, and directs the controller 203 of the external charger 200 through the connector CN1 and the connector CN0. As a result, since the external charger 200 changes the charge circuit which performs charge from the constant-voltage-charge circuit 202 to the constant-current-charge circuit 201, the charging current CCHG supplied to the assembled battery 11 from the external charger 200 becomes a fixed current value.

Next, the battery management unit 60 discriminates whether or not the secondary battery cell whose cell voltage has reached the first voltage V1 exists, based on the respective cell voltages of the secondary battery cells CL1-CL3 detected by the voltage detecting unit 213 of the voltage temperature monitoring circuit 21 (step S12).

But, in a term between the time t2 and a time t3, since the secondary battery cell whose cell voltage has reached the first voltage V1 does not exist (step S12; No), the battery management unit 60 transfers the processing to the step S11 again, and continues the constant current charging (CC charging). When the cell voltage of the secondary battery cell CL1 having the highest cell voltage reaches the first voltage V1 again at the time t3 (step S12; Yes), the battery management unit 60 discriminates whether or not the whole secondary battery cells CL1-CL3 are in the fully charged state (step S13).

But, at the time point t3, since the secondary battery cells CL2, CL3 are not in the fully charged state, as shown in FIG. 5, the whole secondary battery cells CL1-CL3 are not in the fully charged state.

Consequently, the battery management unit 60 performs the constant voltage charging (CV charging) as the charging of the assembled battery 11 (step S14). That is, the battery management unit 60 switches the charging system from the constant current charging (CC charging) to the constant voltage charging (CV charging). Here, the constant voltage value (CV value) is determined based on the cell voltages of the respective secondary battery cells CL or the voltage of the assembled battery 11 at the relevant time point.

In parallel with the constant voltage charging, the battery management unit 60 turns ON the discharge switch SW of the discharge circuit 15 connected to the secondary battery cell CL1 whose cell voltage has reached the first voltage through the equalization processing unit 215 of the voltage temperature monitoring circuit 21, and discharges the secondary battery cell CL1 (step S15).

As a result of these, the secondary battery cell CL1 is discharged again during a term between the time t3 and a time t4, and the cell voltage of the secondary battery cell CL1 decreases, but the other secondary battery cells CL2, CL3 are charged, and the cell voltages of the secondary battery cells CL2, CL3 increase.

Next, the battery management unit 60 discriminates whether or not the cell voltage of the secondary battery cell CL1 has reached the second voltage V2, based on the cell voltage of the secondary battery cell CL1 during discharging which is detected by the voltage detecting unit 213 of the voltage temperature monitoring circuit 21 (step S16). In this case, since the cell voltage of the secondary battery cell CL1 does not reach the second voltage V2 until the time t4 (step S16; No), the battery management unit 60 transfers the processing to the step S14 and the step S15 again, and repeats the similar processing.

On the other hand, the cell voltage of the secondary battery cell CL1 reaches the second voltage V2 at the time t4 (step S16; Yes), and the battery management unit 60 turns OFF the discharge switch SW of the discharge circuit 15 connected to the secondary battery cell CL1 during discharging, and stops the discharging (step S17). And the battery management unit 60 transfers the processing to the step S11, and performs the constant current charging (CC charging) again (step S11).

That is, in order to switch the charging system from the constant voltage charging (CV charging) to the constant current charging (CC charging), the battery management unit 60 changes the charge control signal from the signal of constant-voltage-charge directions Svc to the signal of constant-current-charge directions Scc, and directs the controller 203 of the external charger 200 through the connector CN1 and the connector CN0.

As a result, since the external charger 200 changes the charge circuit which performs charge from the constant-voltage-charge circuit 202 to the constant-current-charge circuit 201, the charging current CCHG supplied to the assembled battery 11 from the external charger 200 becomes a fixed current value. By this means, the cell voltages of the secondary battery cells CL1-CL3 composing the assembled battery 11 gradually increase again as shown in a term between the time t4 and a time t5.

Next, the battery management unit 60 discriminates whether or not the secondary battery cell whose cell voltage has reached the first voltage V1 exists, based on the respective cell voltages of the secondary battery cells CL1-CL3 detected by the voltage detecting unit 213 of the voltage temperature monitoring circuit 21 (step S12). But, in the term between the time t4 and the time t5, since the secondary battery cell whose cell voltage has reached the first voltage V1 does not exist (step S12; No), the battery management unit 60 transfers the processing to the step S11 again, and continues the constant current charging (CC charging).

And, when the cell voltage of the secondary battery cell CL1 having the highest cell voltage reaches the first voltage V1 again at the time t5 (step S12; Yes), the battery management unit 60 discriminates whether or not the whole secondary battery cells CL1-CL3 are in the fully charged state (step S13).

But, also at the time point t5, since the secondary battery cells CL2, CL3 are not in the fully charged state yet as shown in FIG. 5, the whole secondary battery cells CL1-CL3 are not in the fully charged state. Consequently, the battery management unit 60 performs the constant voltage charging (CV charging) as the charging of the assembled battery 11 (step S14). That is, in order to switch the charging system from the constant current charging (CC charging) to the constant voltage charging (CV charging), the battery management unit 60 changes the charge control signal from the signal of constant-current-charge directions Scc to the signal of constant-voltage-charge directions Scv, and directs the controller 203 of the external charger 200 through the connector CN1 and the connector CN0.

As a result, since the external charger 200 changes the charge circuit which performs charge from the constant-current-charge circuit 201 to the constant-potential-charge circuit 202, a voltage of a constant voltage value is applied to the assembled battery 11 from the external charger 200. Here, the constant voltage value (CV value) is also determined based on the cell voltages of the respective secondary battery cells CL or the voltage of the assembled battery 11 at the relevant time point.

In parallel with the constant voltage charging, the battery management unit 60 turns ON the discharge switch SW of the discharge circuit 15 connected to the secondary battery cell CL1 whose cell voltage has reached the first voltage V1 through the equalization processing unit 215 of the voltage temperature monitoring circuit 21, and discharges the secondary battery cell CL1 (step S15).

As a result of these, the secondary battery cell CL1 is discharged again during a term between the time t5 and a time t6, and the cell voltage of the secondary battery cell CL1 decreases. But since the other secondary battery cells CL2, CL3 are continued to be charged, the cell voltages of the secondary battery cells CL2, CL3 increase.

Next, the battery management unit 60 discriminates whether or not the cell voltage of the relevant secondary battery cell CL1 has reached the second voltage V2, based on the cell voltage of the secondary battery cell CL1 during discharging which is detected by the voltage detecting unit 213 of the voltage temperature monitoring circuit 21 (step S16). In this case, since the cell voltage of the secondary battery cell CL1 does not reach the second voltage V2 until the time t6 (step S16; No), the battery management unit 60 transfers the processing to the step S14 and the step S15 again, and repeats the similar processing.

On the other hand, the cell voltage of the secondary battery cell CL1 reaches the second voltage V2 at the time t6 (step S16; Yes), and the battery management unit 60 turns OFF the discharge switch SW of the discharge circuit 15 connected to the secondary battery cell CL1 during discharging, and stops discharging the secondary battery cell CL1 (step S17). And the battery management unit 60 transfers the processing to the step S11 again, and performs the constant current charging (CC charging) again (step S11). That is, in order to switch the charging system from the constant voltage charging (CV charging) to the constant current charging (CC charging), the battery management unit 60 changes the charge control signal from the signal of constant-voltage-charge directions Svc to the signal of constant-current-charge directions Scc, and directs the controller 203 of the external charger 200 through the connector CN1 and the connector CN0. As a result, since the external charger 200 changes the charge circuit which performs charge from the constant-voltage-charge circuit 202 to the constant-current-charge circuit 201, the charging current CCHG supplied to the assembled battery 11 from the external charger 200 becomes a fixed current value. By this means, the cell voltages of the secondary battery cells CL1-CL3 composing the assembled battery 11 gradually increase again as shown in a term between the time t6 and a time t7.

Next, the battery management unit 60 discriminates whether or not the secondary battery cell whose cell voltage has reached the first voltage V1 exists, based on the respective cell voltages of the secondary battery cells CL1-CL3 detected by the voltage detecting unit 213 of the voltage temperature monitoring circuit 21 (step S12). But, in the term between the time t6 and the time t7, since the secondary battery cell whose cell voltage has reached the first voltage V1 does not exist (step S12; No), the battery management unit 60 transfers the processing to the step S11 again, and continues the constant current charging (CC charging).

And, the cell voltages of the secondary battery cell CL1 and the secondary battery cell CL2 come to reach the first voltage V1 at the time t7 (step S12; Yes). As a result of this, the battery management unit 60 discriminates whether or not the whole secondary battery cells CL1-CL3 are in the fully charged state (step S13).

But, also at the time point t7, since the secondary battery cell CL3 is not in the fully charged state yet, the whole secondary battery cells CL1-CL3 are not in the fully charged state. Consequently, the battery management unit 60 performs the constant voltage charging (CV charging) as the charging of the assembled battery 11 (step S14). That is, in order to switch the charging system from the constant current charging (CC charging) to the constant voltage charging (CV charging), the battery management unit 60 changes the charge control signal from the signal of constant-current-charge directions Scc to the signal of constant-voltage-charge directions Scv, and directs the controller 203 of the external charger 200 through the connector CN1 and the connector CN0.

As a result, since the external charger 200 changes the charge circuit which performs charge from the constant-current-charge circuit 201 to the constant-potential-charge circuit 202, a voltage of a constant voltage value is applied to the assembled battery 11 from the external charger 200. Here, the constant voltage value (CV value) is also determined based on the cell voltages of the respective secondary battery cells CL or the voltage of the assembled battery 11 at the relevant time point.

In parallel with the constant voltage charging, the battery management unit 60 turns ON the discharge switches SW of the discharge circuits 15 respectively connected to the secondary battery cell CL1 and the secondary battery cell CL2 whose cell voltages have reached the first voltage V1 through the equalization processing unit 215 of the voltage temperature monitoring circuit 21, and discharges the both secondary battery cells CL1, CL2 (step S15).

As a result of these, the secondary battery cell CL1 and the secondary battery cell CL2 are discharged during a term between the time t7 and a time t8, and the cell voltages of the secondary battery cell CL1 and the secondary battery cell CL2 decrease.

But, since the other secondary battery cell CL3 continues to be charged, the cell voltage of the secondary battery cell CL3 increases.

Next, the battery management unit 60 discriminates whether or not the cell voltage of the secondary battery cell CL1 or the secondary battery cell CL2 has reached the second voltage V2, based on the cell voltages of the secondary battery cell CL1 and the secondary battery cell CL2 during discharging which are detected by the voltage detecting unit 213 of the voltage temperature monitoring circuit 21 (step S16).

In this case, since the cell voltage of the secondary battery cell CL1 or the secondary battery cell CL2 does not reach the second voltage V2 until the time t8 (step S16; No), the battery management unit 60 transfers the processing to the step S14 and the step S15 again, and repeats the similar processing.

On the other hand, the cell voltages of the secondary battery cell CL1 and the secondary battery cell CL2 reach the second voltage V2 at the time t8 (step S16; Yes), and the battery management unit 60 turns OFF the discharge switches SW of the discharge circuits 15 respectively connected to the secondary battery cell CL1 and the secondary battery cell CL2 during discharging, and stops discharging the secondary battery cell CL1 and the secondary battery cell CL2 (step S17). In the above description, a case is shown in which the cell voltages of the secondary battery cell CL1 and the secondary battery cell CL2 reach the second voltage V2. Even in a case in which the cell voltage of any one of the secondary battery cell CL1 or the secondary battery cell CL2 has reached the second voltage V2, the discharging of the both secondary battery cells CL1, CL2 is stopped.

And the battery management unit 60 transfers the processing to the step S11 again, and performs the constant current charging (CC charging) again (step S11). That is, in order to switch the charging system from the constant voltage charging (CV charging) to the constant current charging (CC charging), the battery management unit 60 changes the charge control signal from the signal of constant-voltage-charge directions Svc to the signal of constant-current-charge directions Scc, and directs the controller 203 of the external charger 200 through the connector CN1 and the connector CN0.

As a result, since the external charger 200 changes the charge circuit which performs charge from the constant-voltage-charge circuit 202 to the constant-current-charge circuit 201, the charging current CCHG supplied to the assembled battery 11 from the external charger 200 becomes a fixed current value.

By this means, the cell voltages (storage capacities) of the secondary battery cells CL1-CL3 gradually increase again as shown in a term between the time t8 and a time t9. Next, the battery management unit 60 discriminates whether or not the secondary battery cell whose cell voltage has reached again the first voltage V1 exists, based on the respective cell voltages of the secondary battery cells CL1-CL3 detected by the voltage detecting unit 213 of the voltage temperature monitoring circuit 21 (step S12). In the term between the time t8 and the time t9 shown in FIG. 5, since the secondary battery cell whose cell voltage has reached the first voltage V1 does not exist (step S12; No), the battery management unit 60 transfers the processing to the step S11 again, and continues the constant current charging (CC charging).

And, when the cell voltages of the secondary battery cells CL1-CL3 reach the first voltage V1 at the time t9 (step S12; Yes), the battery management unit 60 discriminates whether or not the whole secondary battery cells CL1-CL3 are in the fully charged state (step S13).

At the time t9, since the whole secondary battery cells CL1-CL3 are in the fully charged state (step S13; Yes), the battery management unit 60 switches the charging system from the constant current charging (CC charging) to the constant voltage charging (CV charging). The charging current CCHG gradually decreases, and then the charging current CCHG does not flow, and thereby the charging processing is finished. In addition, when the step S13 is Yes, the charging may be stopped. As described above, according to the present embodiment, when the constant current charging is performed to the assembled battery, and the cell voltage of any of the secondary battery cells has reached the first voltage V1, the constant voltage charging is performed to the assembled battery while the secondary battery cell whose cell voltage has reached the first voltage V1 is being discharged. And when the cell voltage of the secondary battery cell whose cell voltage had reached the first voltage V1 decreases to the second voltage V2, the constant current charging is again performed, and the charging processing like this is repeated. Accordingly, according to the present embodiment, it becomes possible to make the whole secondary battery cells in the fully charged state, and thereby the storage capacities of the whole secondary battery cells can effectively be utilized.

While a certain embodiment have been described, this embodiment have been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A power source device, comprising:
    an assembled battery which has a plurality of secondary battery cells connected in series;
    a plurality of discharge circuits which is connected in parallel with the plurality of the secondary battery cells, respectively, to discharge the secondary battery cell to which each discharge circuit is connected;
    a voltage detecting unit to detect a voltage of each of the plurality of secondary battery cells; and
    a charge control unit to (i) check whether the voltage detected by the voltage detecting unit reaches a predetermined first voltage while charging the plurality of secondary battery cells, (ii) check whether the voltage of a whole of the secondary battery cells reaches the first voltage, when the voltage detected by the voltage detecting unit reaches the predetermined first voltage, (iii) discharge all the secondary battery cells whose voltage detected by the voltage detecting unit have reached the predetermined first voltage, when the voltage of the whole of the secondary battery cells has not reached the predetermined first voltage; (iv) check whether the voltage of the secondary battery cells which are being discharged, reach a predetermined second voltage, and (v) recharge the second battery cell whose voltage detected by the voltage detecting unit have reached the predetermined second voltage,
    wherein the charge control unit repeats the charging, the discharging and the recharging until the voltage of the whole of the secondary battery cells simultaneously reaches the predetermined first voltage.

2. The power source device according to claim 1, wherein the predetermined first voltage corresponds to voltage at a fully charged state of the secondary battery cell.

3. The power source device according to claim 1, wherein the charge control unit uses constant voltage when charging the secondary battery cells.

* * * * *